United States Patent
Al-Ali et al.

(10) Patent No.: US 10,914,853 B2
(45) Date of Patent: Feb. 9, 2021

(54) CONTINUOUS SEISMIC RESERVOIR MONITORING USING A COMMON FOCUS POINT METHOD

(71) Applicant: Saudi Arabian Oil Company, Dhahran (SA)

(72) Inventors: Mustafa Al-Ali, Manama (BH); Hongwei Liu, Dhahran (SA); Philippe Nivlet, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 320 days.

(21) Appl. No.: 15/918,611

(22) Filed: Mar. 12, 2018

(65) Prior Publication Data

US 2018/0267187 A1    Sep. 20, 2018

Related U.S. Application Data

(60) Provisional application No. 62/472,407, filed on Mar. 16, 2017.

(51) Int. Cl.
*G01V 1/30*    (2006.01)
*G01V 1/34*    (2006.01)

(52) U.S. Cl.
CPC .............. *G01V 1/308* (2013.01); *G01V 1/345* (2013.01); *G01V 2210/6122* (2013.01)

(58) Field of Classification Search
CPC ........ G01V 1/308; G01V 1/345; G01V 1/003; G01V 1/50; G01V 2210/614; E21B 49/00
See application file for complete search history.

(56) References Cited

U.S. PATENT DOCUMENTS 3,731,270 A    5/1973   Penhollow
7,966,882 B2*  6/2011   Greenwood .......... G01N 29/024
                                                73/30.01

(Continued)

FOREIGN PATENT DOCUMENTS

GB    2433780      7/2007
WO    2019055565   3/2019

OTHER PUBLICATIONS

Liu and Al-Ali, "Common-focus point-based target-oriented imaging approach for continuous seismic reservoir monitoring," Geophysics vol. 83, Issue 4, Jul.-Aug. 2018, 8 pages.

(Continued)

*Primary Examiner* — Elias Desta
(74) *Attorney, Agent, or Firm* — Fish & Richardson P.C.

(57) ABSTRACT

A method of continuous seismic reservoir monitoring includes receiving a plurality of seismic data sets associated with a reservoir during a period, where the plurality of seismic data sets corresponds to seismic data received at different times during the period. The reservoir includes a plurality of reflectors, where each reflector has a reflection coefficient. For each of the plurality of seismic data sets, the reflection coefficients of the plurality of reflectors are determined by iteratively updating common focus point (CFP) operators associated with the plurality of reflectors and a plurality of acquisition surface locations. The reflection coefficients corresponding to different seismic data sets are compared to determine changes of the reflection coefficients during the period. The changes of the reflection coefficients are displayed.

20 Claims, 10 Drawing Sheets
(6 of 10 Drawing Sheet(s) Filed in Color)

(56) References Cited

U.S. PATENT DOCUMENTS

| | | | |
|---|---|---|---|
| 9,477,000 | B2 | 10/2016 | Yang |
| 10,107,927 | B2 | 10/2018 | Alkhatib |
| 2001/0021940 | A1* | 9/2001 | Fujii .................. H03H 21/0014 708/318 |
| 2008/0294387 | A1 | 11/2008 | Anderson et al. |
| 2010/0177595 | A1 | 7/2010 | Khare et al. |
| 2011/0199860 | A1 | 8/2011 | Houck et al. |
| 2012/0113750 | A1 | 5/2012 | Al-Momin et al. |
| 2013/0301387 | A1 | 11/2013 | Van Groenstijn |
| 2014/0172307 | A1 | 6/2014 | Svay et al. |
| 2014/0200815 | A1 | 7/2014 | Muroyama et al. |
| 2018/0120461 | A1 | 5/2018 | Allegar et al. |
| 2018/0267187 | A1 | 9/2018 | Al-Ali et al. |

OTHER PUBLICATIONS

Carvalho dos Santos et al., "Semi-Quantitative 4D Seismic Interpretation Integrated with Reservoir Simulation: Application to the Norne Field," Interpretation, vol. 6, Issue 3, Aug. 2018, 11 pages.

Chadwick et al., "4D Seismic quatification of a prowing CO2 plune at Sleipner, North Sea," in Dore and Vining, Petroleum Geology: North-West European and Global Perspectives—Proceeding of the 6th Petroleum Geology Conference, 2005, 15 pages.

Gousselin et al., "History of Matching Using Time-Lapse Sesimic (HUTS)," SPE-84464-MS, presented at the SPE Annual Technical Conference and Exhibition, Oct. 5-8, 2003, 2 pages, Abstract Only.

Hodgson et al., "Generating value from 4D through efficient integration," The Leading Edge, Vo. 36, No. 5, May 2017, 6 pages.

Huang et al., "The First Post-Injection Seismic Monitor Survey at the Ketzin Pilot CO2 Storage Site: Results from Time-Lapse Analysis," Geophysical Prospecting, vol. 66, Issue 1, Jan. 2018, 23 pages.

Nivlet et al., "A New Methodology to Account for Uncertainties in 4D Seismic Interpretation," Processions of the SEG Annual Meeting, San Antonio, Sep. 9-14, 2001, 4 pages.

Skjervheim et al., "Incoporating 4D Seismic Data in Reservoir Simulation Models Using Ensemble Kalman Filter," SPE 95789, presented at the 2005 SPE Annual Technical Conference and Exhibition on Oct. 9-12, 2005, 11 pages.

Winthaegen et al., "CFP-approach to time-lapse angle-dependent reflectivity analysis," SEG International Exposition and Annual Meeting, Sep. 9, 2001, 4 pages.

Al-Ali, "Land seismic data and acquisition and preprocessing: an operator solution to the near-surface problem," retrieved from the Internet via URL: <https://repository.tudelft.nl/islandora/object/uuid:baa60972-94c0-4c74-8642-6015db8e61a0?collection=research#>, retrieved on Jun. 11, 2018, published Jun. 18, 2007, 34 pages.

Berkhout, "Pushing the limits of seismic imaging, Part I: Prestack migration in terms of double dynamic focusing," Geophysics vol. 62, No. 3, May 1, 1997, 17 pages.

International Search Report and Written Opinion issued in International Application No. PCT/US2018/022164 dated Jun. 27, 2018, 14 pages.

Gulf Cooperation Council Examination Report issued in GCC Application No. GC 2018-34966 dated Oct. 6, 2019, 4 pages.

Al-Ali et al., "An integrated method for resolving the seismic complex near-surface problem," Geophysical Prospecting, Nov. 2006, 54:739-750.

Liu et al., "A Target-oriented imaging approach for continuous seismic reservoir monitoring," presented at the 79th EAGE Conference & Exhibition, Paris, France, Jun. 12-15, 2017, 5 pages.

Xu et al., "3D angle gathers from reverse time migration," Geophysics, Society of Exploration Geophysicists, Mar. 2011, 76(3): 77-92.

PCT International Search Report and Written Opinion in International Appln. No. PCT/US2020/028428, dated Jul. 24, 2020, 16 pages.

Huang et al., "Direct correlation of 4D seismic with well activity for a clarified dynamic reservoir interpretation," Geophysical Prospecting, Aug. 2011, 60(2): 293-312.

Yin et al., "Enhancement of dynamic reservoir interpretation by correlating multiple 4D seismic monitors to well behavior," Interpretation, May 2015, 3(2): SP35-SP52.

PCT International Search Report and Written Opinion in International Appln. No. PCT/US2020/025679, dated Jul. 14, 2020, 15 pages.

GCC Examination Report in GCC Appln. No. GC 2018-34966, dated Aug. 31, 2020, 3 pages.

* cited by examiner

CONTINUOUS SEISMIC RESERVOIR MONITORING USING A COMMON FOCUS POINT METHOD

PRIORITY CLAIM REFERENCE TO RELATED APPLICATIONS

This application claims priority to U.S. Application Ser. No. 62/472,407 filed on Mar. 16, 2017, the entire contents of which is hereby incorporated by reference.

TECHNICAL FIELD

This disclosure relates to seismic data processing.

BACKGROUND

Continuous reservoir monitoring over a period of time involves seismic depth imaging methods that can generate fast and accurate images to cope with massive data sets acquired. A crucial step in seismic imaging for continuous reservoir monitoring is estimation of wavefields within the earth's solid interior where no direct observations are available. Standard estimation based on seismic data recorded along an open boundary of surface receivers is generally insufficient to explain how energy propagates in the complex subsurface unless high-resolution seismic velocity models are available prior to imaging or otherwise multiple scattered waves (multiples) in the subsurface cannot be accurately predicted. In some cases, rigorous depth-oriented velocity estimation methods are used for an entire overburden to produce sufficiently accurate velocity models.

SUMMARY

The present disclosure describes methods and systems, including computer-implemented methods, computer program products, and computer systems for continuous seismic reservoir monitoring using a common focus point (CFP) method.

In an implementation, a plurality of seismic data sets is received associated with a reservoir during a period, where the plurality of seismic data sets corresponds to seismic data received at different times during the period. The reservoir includes a plurality of reflectors, where each reflector has a reflection coefficient. For each of the plurality of seismic data sets, reflection coefficients of the plurality of reflectors are determined by iteratively updating common focus point (CFP) operators associated with the plurality of reflectors and a plurality of acquisition surface locations. The reflection coefficients corresponding to different seismic data sets are compared to determine changes of the reflection coefficients during the period. The changes of the reflection coefficients are displayed.

The previously-described implementation can be implemented using a computer-implemented method, a non-transitory, computer-readable medium storing computer-readable instructions to perform the computer-implemented method, and a computer-implemented system comprising a computer memory interoperably coupled with a hardware processor configured to perform the computer-implemented method/the instructions stored on the non-transitory, computer-readable medium.

The subject matter described in this disclosure enables four-dimensional continuous seismic reservoir monitoring by efficiently and effectively processing massive seismic data sets to quickly and accurately generate seismic images. The described approach is based on a robust iterative operator updating procedure without deriving a detailed velocity model and without processing entire acquired three-dimensional datasets. The generated seismic images and the determined changes of the reflection coefficients during a period of time can be used for effective oil and gas exploration, such as determining drilling parameters for oil wells. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

The following detailed description describes continuous seismic reservoir monitoring using a common focus point (CFP) method and is presented to enable any person skilled in the art to make and use the disclosed subject matter in the context of one or more particular implementations. Various modifications, alterations, and permutations of the disclosed implementations can be made and will be readily apparent to those skilled in the art. The general principles defined in the disclosed implementations may be applied to other implementations and applications without departing from scope of the disclosure. Thus, the present disclosure is not intended to be limited to the described or illustrated implementations, but is to be accorded the widest scope consistent with the principles and features disclosed.

Seismic data collected over a period of time can be used to generate seismic images to monitor changes in a reservoir. For example, seismic reflection data of the reservoir can be acquired once a month over a period of time. The acquired multiple seismic data sets can be used to generate multiple three-dimensional (3D) seismic images to determine changes of the reservoir over the period of time, for example, changes of hydrocarbon liquid's composition or location. At a high level, the described approach uses a CFP method on successive 3D seismic data sets to iteratively update CFP operators based on CFP gathers and differential time shift (DTS) gathers without deriving a detailed velocity model.

Figure 1:
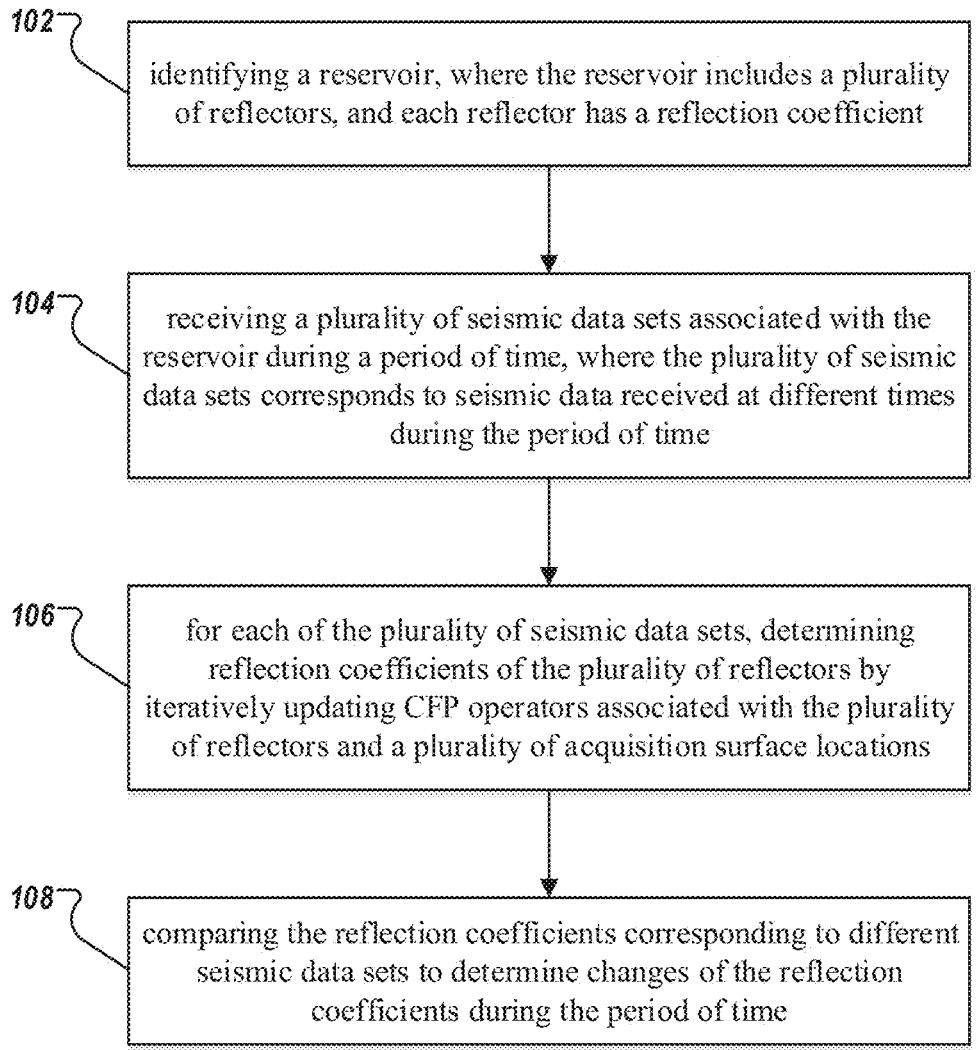
FIG. 1 is a flowchart of an example method for continuous seismic reservoir monitoring using a common focus point (CFP) method, according to some implementations.

FIG. 1 is a flowchart of an example method 100 for continuous seismic reservoir monitoring using a CFP method, according to some implementations. For clarity of presentation, the description that follows generally describes method 100 in the context of the other figures in this disclosure. For example, method 100 can be performed by a computer system described in FIG. 6. However, it will be understood that method 100 may be performed, for example, by any suitable system, environment, software, and hardware, or a combination of systems, environments, software, and hardware as appropriate. In some implementations, various steps of method 100 can be run in parallel, in combination, in loops, or in any order.

The method 100 starts at block 102 where a reservoir is identified. For example, the reservoir can include one or more subsurface layers within the earth, and a geographical boundary of the reservoir can be identified based on inputs from a user. The reservoir can include multiple reflectors, and each reflector can have a reflection coefficient. For instance, the reservoir can be a 3D region of a length 5 kilometer (km), a width 5 km, and a depth 5 km. If each reflector is modelled as a cube of a length 5 meter (m), a width 5 m, and a depth 5 m, the reservoir can be represented by $10^9$ reflectors. The location of a reflector can be represented by the center of the cube or other points in the cube. In some implementations, the reservoir can be divided into cubes, and the cube corners can represent the reflectors in the reservoir. For example, if the region is divided into 5 m by 5 m by 5 m cubes, the reservoir can be represented by $1001^3$ reflectors. Other methods can also be used to determine a set of reflectors to represent the reservoir.

At block 104, multiple seismic data sets associated with the reservoir are received during a period of time, where the multiple seismic data sets correspond to seismic data received at different times during the period of time. For example, seismic data of the reservoir can be acquired once a month over 18 months and a total 18 sets of seismic data can be acquired. During seismic data acquisition, a number of receivers (for example, geophones or hydrophones) can be positioned on or below the earth surface. A seismic source can send seismic waves into the earth, and the receivers can record waves reflected by each subsurface layer within the earth. The seismic source can be, for example, towed by a truck and generate seismic waves at different locations. For example, the seismic source can fire a first shot at a first location for receivers to record reflected waves, and the seismic source moves to a second location to fire a second shot. The recorded data at each receiver corresponding to a single shot is called a trace. For instance, if the seismic source fired shots at 100,000 different locations and there are 1,000 receivers, the resultant seismic data set can have $10^8$ traces.

At block 106, for each seismic data set, reflection coefficients of reflectors in the reservoir can be determined by iteratively updating CFP focusing operators associated with the reflectors and multiple acquisition surface locations. The acquisition surface locations can include seismic source locations and seismic receiver locations. In the earlier reservoir example of 100,000 shot locations and 1,000 receivers, there are a total of 101,000 acquisition surface locations.

Iteratively updating the focusing operators can be data-driven using one-way Green's functions based on CFP method as shown in Equations (1) and (2), $$F^{(i+1)}(z_0, z_m) = F^{(i)}(z_0, z_m) \Delta F^{(i)}(z_0, z_m), i = 0, 1, \ldots \quad (1)$$

$$\Delta F^{(i)}(z_0, z_m) = e^{i\omega \frac{\Delta T^{(i)}}{2}} \quad (2)$$

where the CFP operator $F^{(i)}(z_0, z_m)$ describes a propagation time or traveltime between the acquisition surface location $z_0$ and a target reflector $z_m$ at the ith iteration, $\Delta F^{(i)}(z_0, z_m)$ updates the traveltime between the acquisition surface location $z_0$ and the target reflector $z_m$ by $\Delta T^{(i)}/2$, and $\omega$ is an angular frequency. Note that Equations (1) and (2) are expressed in a frequency domain, where operator $F^{(i)}(z_0, z_m)$ is a Fourier transform of a Dirac delta function that has an infinite value at the time corresponding to the traveltime between the acquisition surface location $z_0$ and the target reflector $z_m$ and zero elsewhere. The iterative updating operation can also be expressed in a time domain by $$F^{(i+1)}(z_0, z_m) = F^{(i)}(z_0, z_m) * \Delta F^{(i)}(z_0, z_m), i = 0, 1, \ldots, \quad (3)$$

$$\Delta F^{(i)}(z_0, z_m) = \delta\left(t + \frac{\Delta T^{(i)}}{2}\right), \quad (4)$$

where * denotes convolution, $\delta$ is a Dirac delta function, and $t$ is the traveltime of the initial Green's function. In some cases, as will be discussed later, $\Delta T^{(i)}$ in Equation (2) or (4) is a picked time deviation from a zero time in a differential time shift (DTS) gather.

In some implementations, the initial CFP operator $F^{(0)}(z_0, z_m)$ can be any rough estimation of the traveltime between $z_0$ and $z_m$. In a typical implementation, a normal moveout (NMO) velocity defined at a target horizon can be used to derive the initial operator. Note that in a CFP gather as will be explained later, reflection events besides the one from the target reflector can still be present. The equal-traveltime principle affirms that the traveltimes of the target reflections in each CFP gather will be the same as the time-reverse of the respective focusing operator if the kinematics of the operator are correct. According to the equal-traveltime principle, DTS gathers, as will be explained later, can be generated by time correlating the focusing operators, trace by trace, to their respective CFP gathers. Based on an automated picking on the DTS gathers, the focusing operators at the ith iteration are updated iteratively using Equation (1) or (3) until the principle of equal-traveltime is fulfilled (that is, the target event in DTS gathers becomes flat) for each subsurface grid point of the target reflector. $\Delta T^{(i)}$ in Equation (2) or (4) is the picked time deviation from a zero time in the DTS gather. The target oriented stacked image could be derived by stacking the DTS gathers from the final focusing operators.

Figure 2:
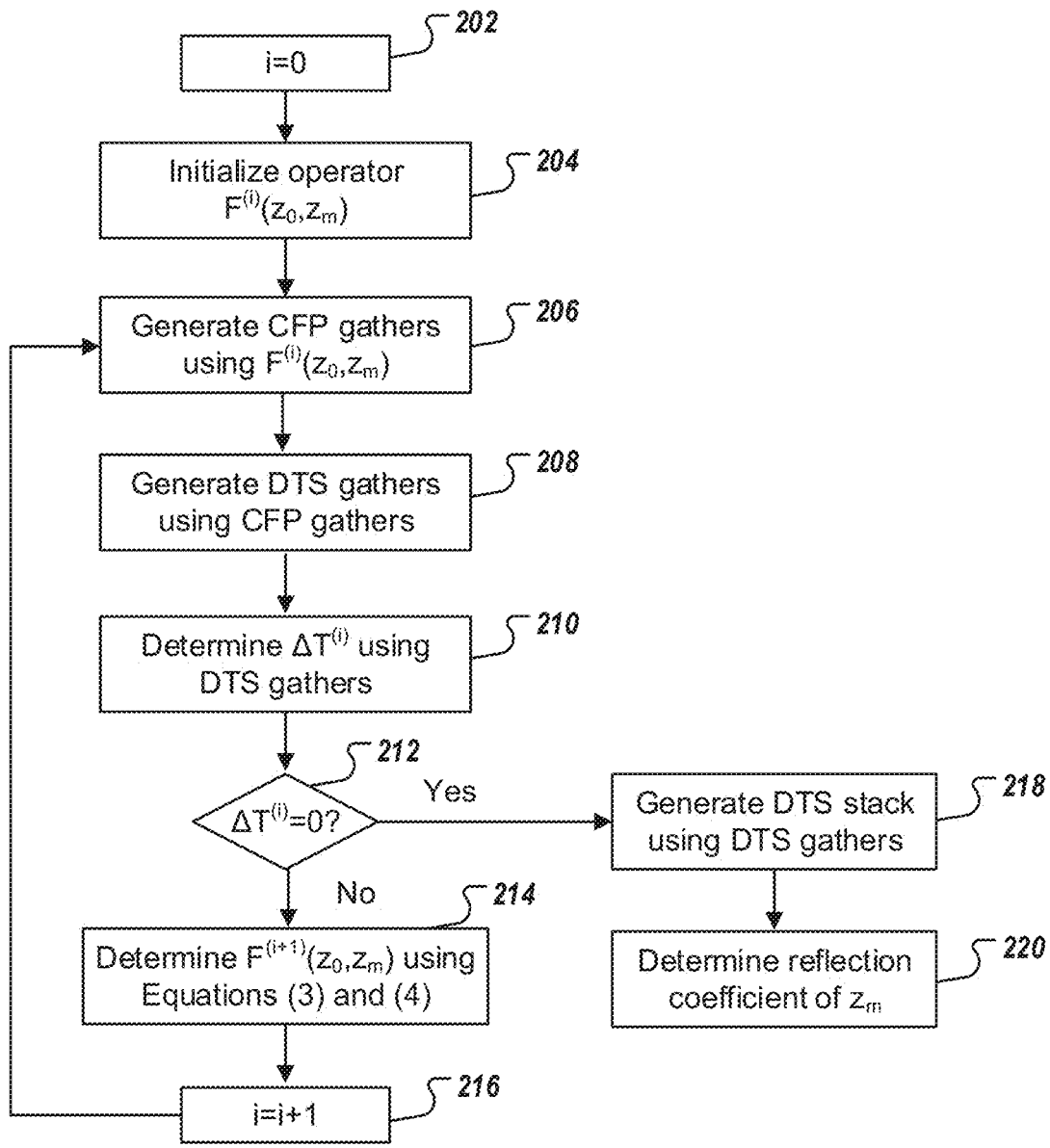
FIG. 2 is a flowchart of an example method for iteratively updating CFP focusing operators for one reflector, according to some implementations.

FIG. 2 is a flowchart of an example method 200 for iteratively updating CFP focusing operators for one reflector, according to some implementations. In other words, the method 200 is performed for each reflector, and in the earlier reservoir example of $10^9$ reflectors, the method 200 can be performed $10^9$ times. For clarity of presentation, the description that follows generally describes method 200 in the context of the other figures in this disclosure. For example, method 200 can be performed by a computer system described in FIG. 6. However, it will be understood that method 200 may be performed by a system, an environment, software, hardware, or a combination of systems, environments, software, and hardware as appropriate. In some implementations, various steps of method 200 can be run in parallel, in combination, in loops, or in any order.

The method 200 starts at block 202 where an iteration counter i is initialized as zero, and a target reflector $z_m$ is chosen.

At block 204, the operator $F^{(0)}(z_0, z_m)$, which describes the traveltime between an acquisition surface location $z_0$ and the target reflector $z_m$ is initialized for each acquisition surface location. In the earlier reservoir example of 101,000 acquisition surface locations, the initial operator $F^{(0)}(z_0, z_m)$ will be determined for 101,000 pairs of $z_0$ and $z_m$. In some implementation, a normal moveout (NMO) velocity defined at a target horizon can be used to derive the initial operator. For example, since the target reflector location and the acquisition surface location are known, an initial traveltime can be derived based on the NMO velocity and the distance between the target reflector and the acquisition surface location. In some implementations, $F^{(0)}(z_0, z_m)$ can equal $e^{i\omega T_{NMO}}$ in a frequency domain or $\delta(t+T_{NMO})$ in a time domain, where $T_{NMO}$ is the initial traveltime estimated based on the NMO velocity.

At block 206, CFP gathers are generated using $F^{(i)}(z_0, z_m)$. In the initial iteration, CFP gathers are generated using $F^{(0)}(z_0, z_m)$. In some implementations, the seismic data is sorted based on acquisition surface locations. For example, the seismic data is sorted based on receiver locations. In the earlier reservoir example, the $10^8$ traces of seismic data can be sorted in the following order: the 100,000 traces received at the first receiver, the 100,000 traces received at the second receiver, and so on. Each of the 100,000 traces from the first receiver correlates with a corresponding operator $F^{(i)}(z_0, z_m)$, where $z_0$ is the seismic source location corresponding to the particular trace. By correlating with the operator $F^{(i)}(z_0, z_m)$, each trace will be time-shifted (or corrected) based on the traveltime in the operator. After applying corresponding operators $F^{(i)}(z_0, z_m)$ to the 100,000 traces at the first receiver, the resultant 100,000 traces will be added up to become one CFP trace. Similarly, after applying corresponding operators $F^{(i)}(z_0, z_m)$ to the 100,000 traces at the second receiver, the resultant traces are added up to become a second CFP trace. After applying the operators to the traces at the 1,000 receivers, 1,000 CFP traces are generated. In some implementations, multiple CFP traces can form one CFP gather, for example, the 1000 CFP traces forming one CFP gather. In some implementations, one CFP trace is a CFP gather.

At block 208, DTS gathers can be generated by correlating CFP gathers with operators $F^{(i)}(z_0, z_m)$. Each CFP gather can be correlated with a corresponding operator $F^{(i)}(z_0, z_m)$, where $z_0$ is the receiver location corresponding to the particular CFP gather. In the earlier reservoir example, 1,000 DTS gathers can be generated based on the 1,000 CFP gathers.

At block 210, two-way residual traveltimes $\Delta T^{(i)}$ can be determined based on the DTS gathers. For example, a reflection event can be identified from the DTS gathers, and a two-way residue traveltime $\Delta T^{(i)}$ can be determined based on a time deviation of the reflection event from zero time. For the earlier reservoir example, FIG. 3A (as will be discussed more later) shows 1,000 DTS gathers corresponding to 1,000 receivers with an index from 1 to 1000. The red line 302 illustrates a reflection event. For each DTS gather, a $\Delta T^{(i)}$ can be determined which equals a time difference between the red line 302 and zero time, and 1000 $\Delta T^{(i)}$'s can be determined for the 1,000 receiver locations from FIG. 3A. In some implementations, the two-way residue traveltimes obtained from the DTS gathers can be interpolated to generate a full set of residue traveltimes for all acquisition surface locations. For example, the 1000 $\Delta T^{(i)}$'s obtained from FIG. 3A can be interpolated to generate 101,000 $\Delta T^{(i)}$'s for the 101,000 acquisition surface locations. Interpolation methods such as Delaunay triangulation method can be used. In some cases, the seismic data can also be sorted based on source locations, and steps 206-210 can be performed on the sorted data to generate 100,000 $\Delta T^{(i)}$'s corresponding to the 100,000 source locations.

At block 212, a determination is made whether the $\Delta T^{(i)}$'s from the DTS gathers are zero or close to zero (for example, within a predetermined threshold from zero). In other words, block 202 determines whether DTS gathers include a flat reflection event at zero time. A flat event at zero time indicates that final focusing operators have been found and the iteration can be stopped, where method 200 proceeds to block 218. If DTS gathers do not include a flat event at zero time, method 200 proceeds to block 214 to update operators iteratively.

At block 214, operator $F^{(i+1)}(z_0, z_m)$ can be determined based on Equations (3) and (4) (or Equations (1) and (2)) for each acquisition surface location. For example, the 1000 $\Delta T^{(i)}$'s corresponding to the 1,000 receivers are used to update the CFP operators for the 1,000 receiver locations, and the 100,000 $\Delta T^{(i)}$'s corresponding to the 100,000 source locations are used to update the CFP operators for the 100,000 source locations.

At block 216, the iteration counter i is increased by one, and method 200 returns to block 206 and applies the updated operators to the original seismic data recorded by the receivers to generate CFP and DTS gathers.

At block 218, after the final focusing operators have been found (when DTS gathers show a flat reflection event), a DTS stack can be generated by adding the DTS gathers from the final operators. In the earlier reservoir example, the 1000 DTS gathers are added to generate one DTS stack.

At block 220, the reflection coefficient for the target reflector $z_m$ can be determined to be the value of the DTS stack at zero time.

After applying method 200 to each reflector $z_m$, a seismic image can be generated from the seismic data set, where the seismic image includes reflection coefficients for all reflectors in the reservoir. In some implementations, the generated seismic image can be a 3D image.

Turning back to FIG. 1, at block 108, reflection coefficients of reflectors (or seismic images) corresponding to different seismic data sets can be compared to determine changes of the reflection coefficients during the period of time. For example, seismic data acquired each month can generate a seismic image. The 18 seismic images during the 18 months can be compared to monitor changes in the reservoir, such as composition or location changes of the hydrocarbon liquid in the reservoir.

FIGS. 3A-5B illustrate using the described approach to generate efficient and accurate 3D target-oriented seismic images from time-lapse field seismic datasets acquired in a project where $CO_2$ is injected into a reservoir. In the project, a full 3D seismic survey is carried out every month with a dense shot distribution (10 m interval on both x and y directions) and about 1000 buried receivers at depth of 70 m below the surface. The receivers are buried to mitigate the influence of near surface complexity and to enhance the repeatability between surveys. Reciprocity is employed to generate the CFP and DTS gathers from which the focusing operators are derived. Baseline survey acquired prior to $CO_2$ injection is used to generate focusing operators using CFP and DTS gathers. Applying the described approach to the time-lapse datasets reveals changes at the reservoir level, which are consistent with the $CO_2$ injection history.

Figure 3A:
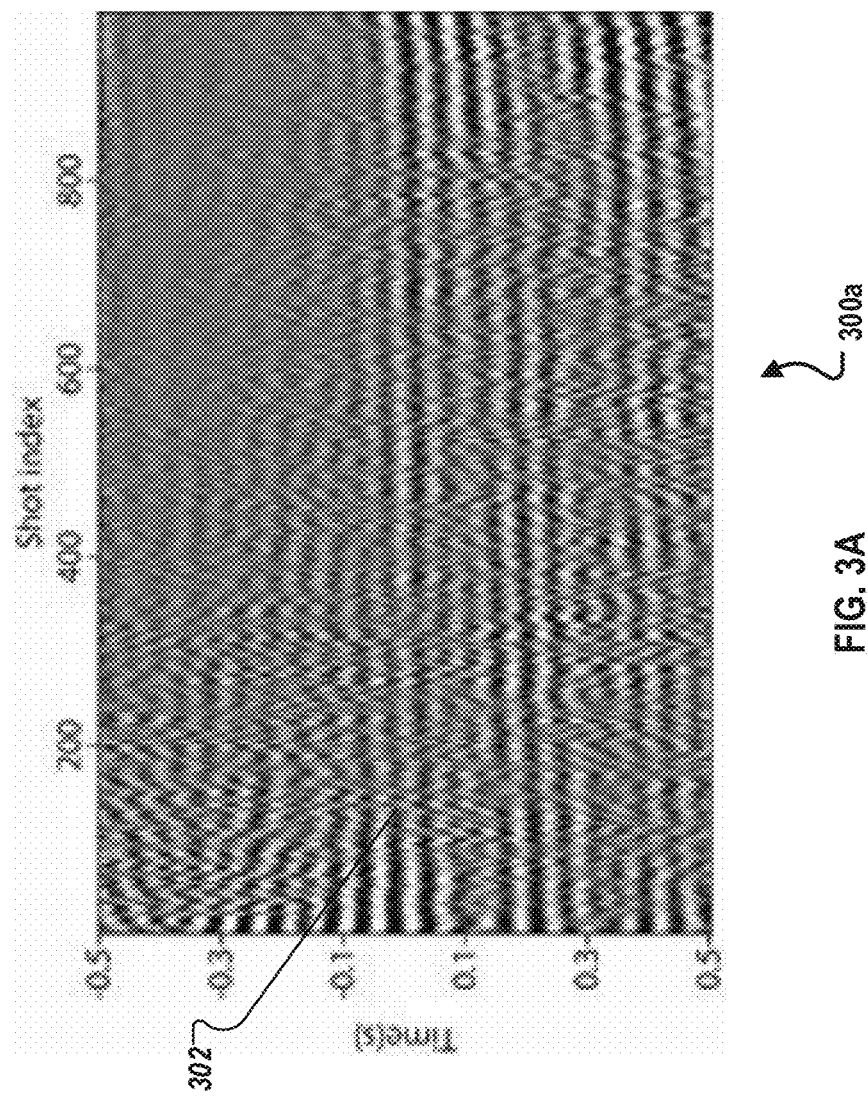
FIG. 3A illustrates a set of differential time shift (DTS) gathers using initial focusing operators for one target reflector, according to some implementations.

FIG. 3A illustrates a set of DTS gathers 300a using initial focusing operators for one target reflector, according to some implementations. In FIG. 3A, the horizontal axis represents a DTS gather index, and the vertical axis represents a time in second. As discussed earlier, the set of DTS gathers 300a includes about 1,000 DTS gathers by using initial focusing operators $F^{(0)}(z_0, z_m)$ (shown in FIG. 4A and will be discussed later), which are derived from an NMO velocity. The set of DTS gathers 300a includes an automatically-picked reflection event illustrated by the red line 302. Since the maximum offset in the project is 3 km, the DTS gathers from the initial focusing operators appear to include a nearly flat event at zero time, while residual time variations can still be computed from the reflection event 302 and used to update the focusing operators.

Figure 3B:
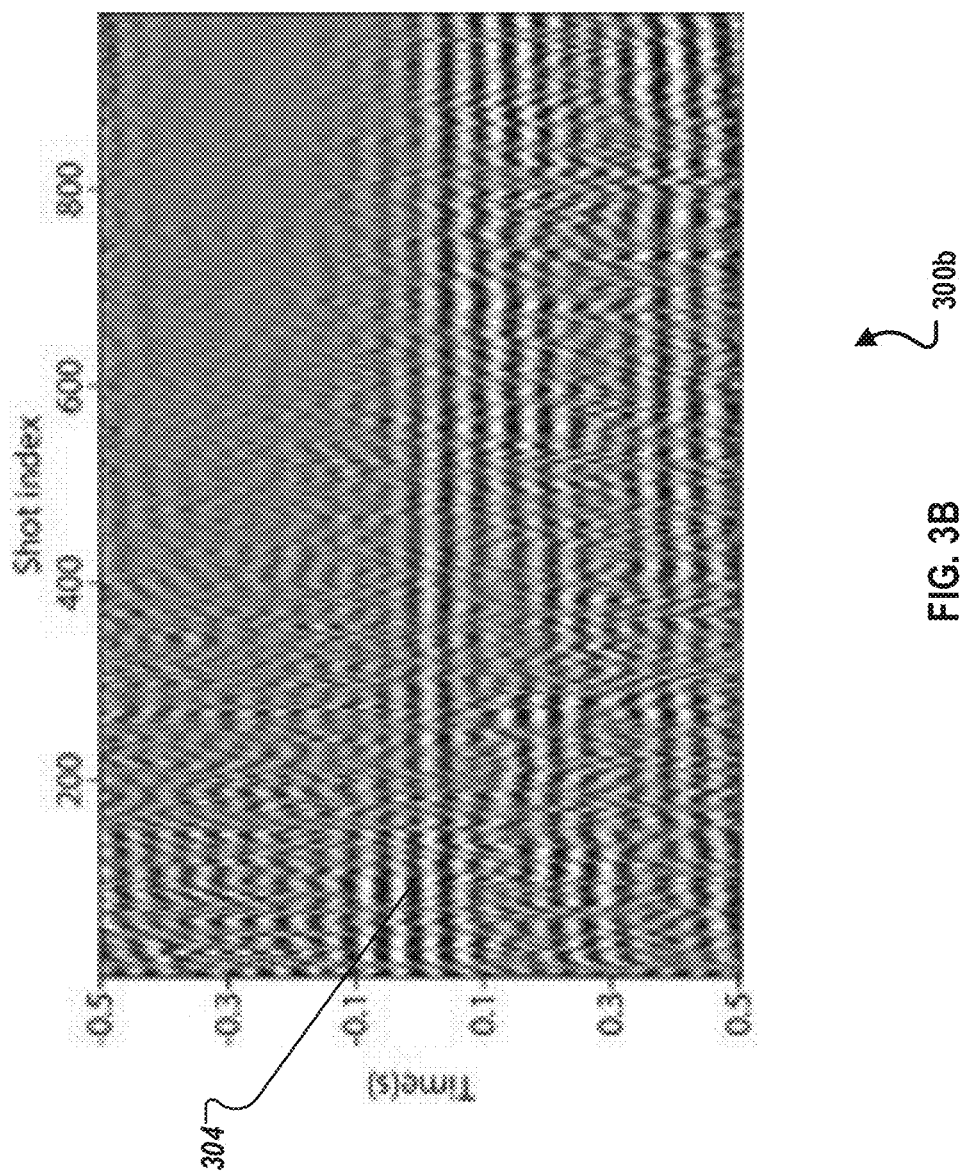
FIG. 3B illustrates a set of DTS gathers using updated focusing operators for one target reflector, according to some implementations.

FIG. 3B illustrates a set of DTS gathers 300b using updated focusing operators for one target reflector, according to some implementations. In FIG. 3B, the horizontal axis represents a DTS gather index, and the vertical axis represents a time in second. The set of DTS gathers 300b includes about 1,000 DTS gathers by using the updated operators $F^{(1)}(z_0, z_m)$ (shown in FIG. 4B and will be discussed later) after updating the initial focus operators for one iteration. The set of DTS gathers 300b includes a reflection event 304 which is a flat event at time zero.

Figure 4A:
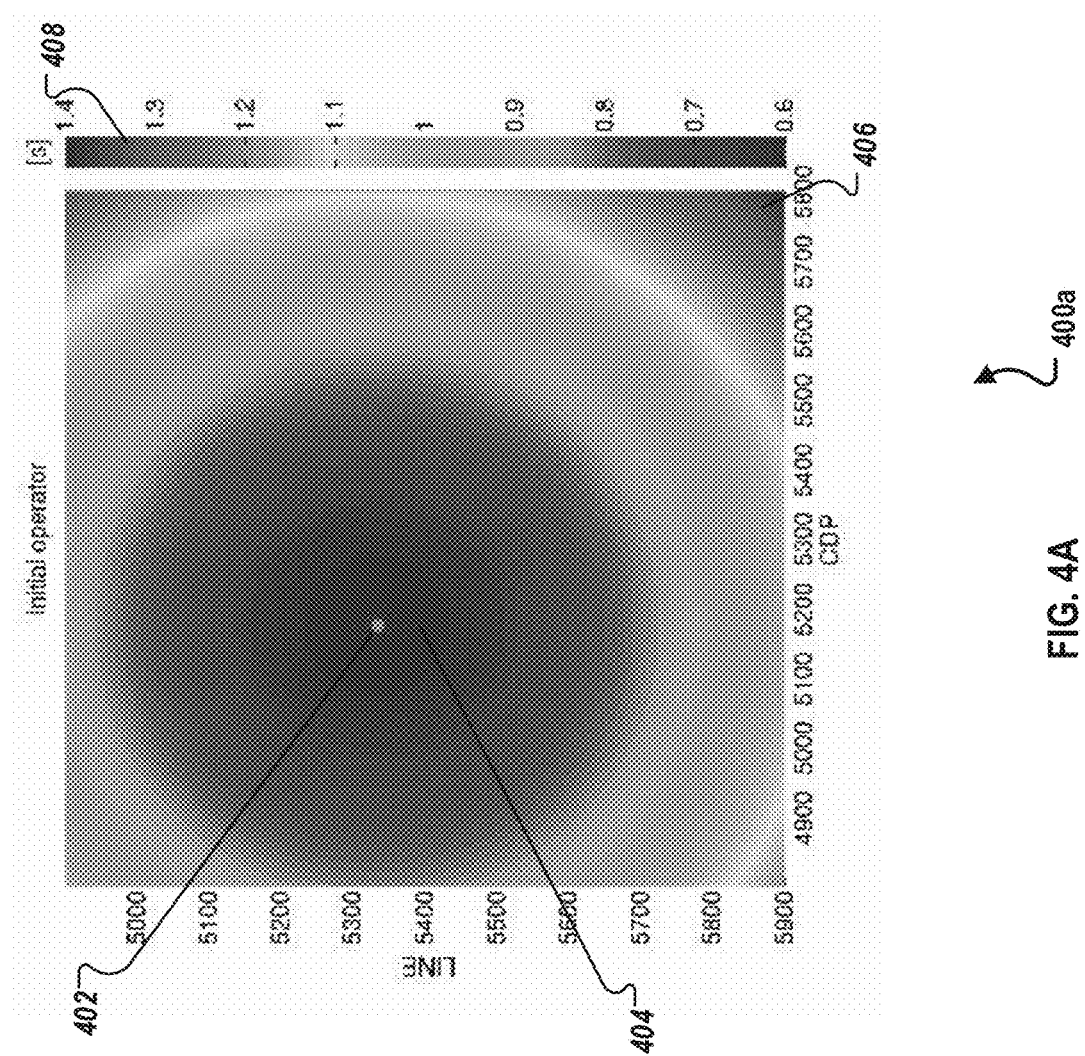
FIG. 4A illustrates initial focusing operators for one target reflector, according to some implementations.
Figure 4B:
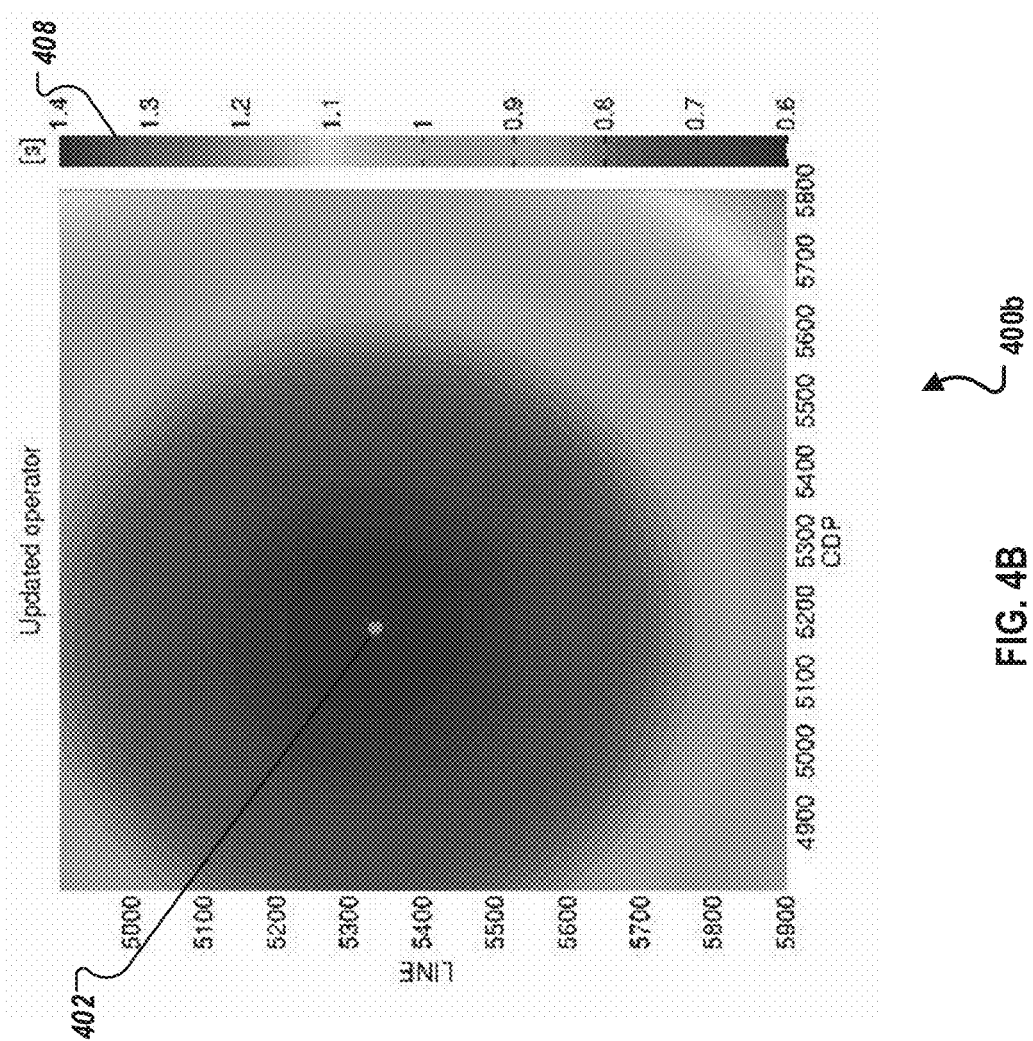
FIG. 4B illustrates updated focusing operators after one iteration for one target reflector, according to some implementations.
Figure 4C:
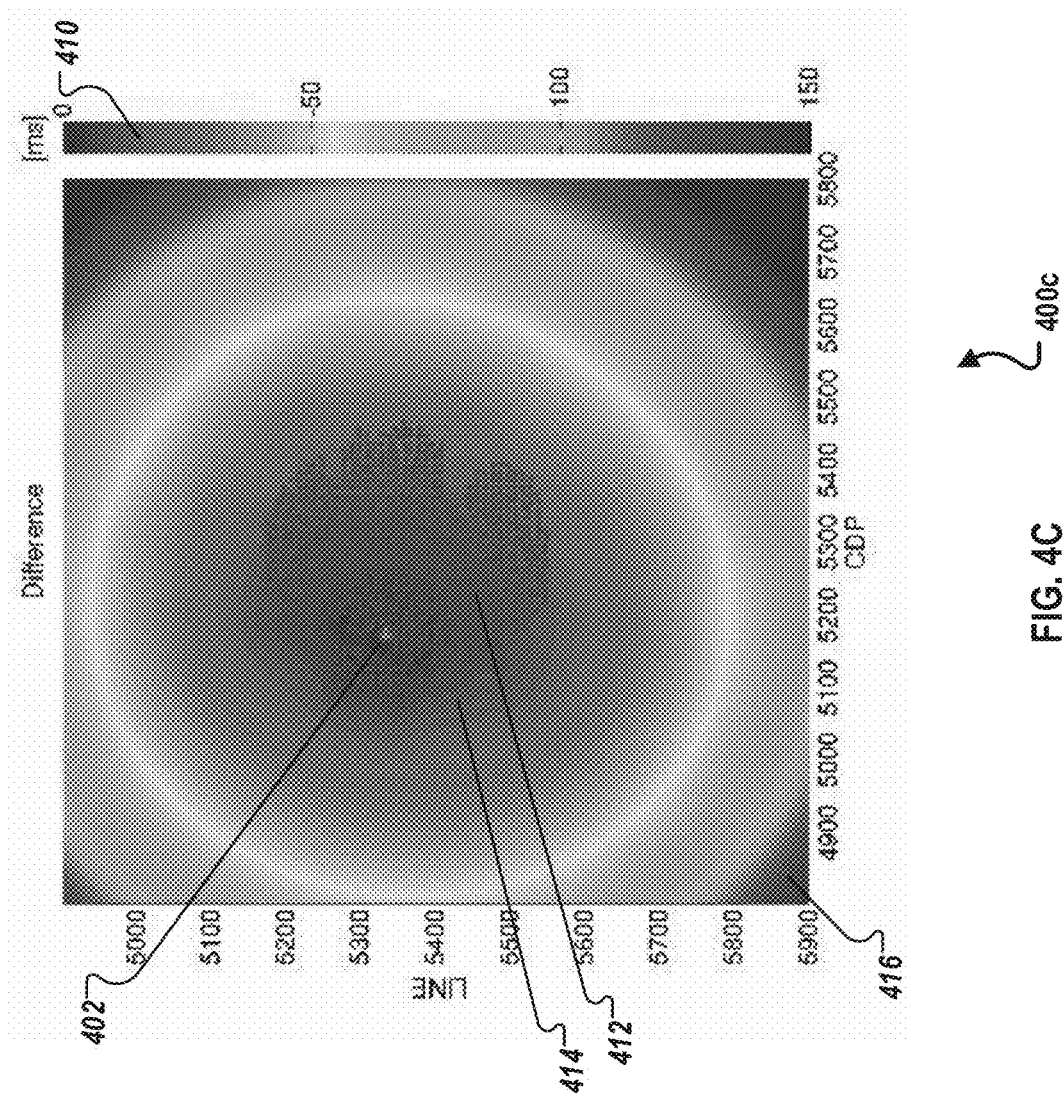
FIG. 4C illustrates a difference between initial focusing operators and updated focusing operators for one target reflector, according to some implementations.

FIG. 4A illustrates initial focusing operators 400a for one target reflector, according to some implementations. FIG. 4A shows initial focusing operators between the target reflector and all acquisition surface locations. The horizontal and vertical axis represent a grid index in x and y directions of the acquisition surface, respectively. Green dot 402 indicates the position of the target reflector. Color bar 408 depicts a mapping between colors of a color spectrum and a continuous range of a traveltime in seconds. For example, red areas such as 406 indicate focusing operators with a traveltime of about 1.4 seconds, while dark blue areas such as 404 indicate focusing operators with a traveltime of about 0.6 seconds. Similarly, FIG. 4B illustrates updated focusing operators 400b after one iteration for one target reflector, according to some implementations. FIG. 4C illustrates a difference 400c between initial focusing operators 400a and updated focusing operators 400b for one target reflector, according to some implementations. Color bar 410 depicts a mapping between colors of a color spectrum and a continuous range of a traveltime in seconds. For example, red areas such as 414 indicate a traveltime difference of about zero, while dark blue areas such as 416 indicate a traveltime difference of about 150 milliseconds. Blue dots 412 indicate positions of buried receivers. Because of sparseness of the buried receivers depicted by the blue dots in FIG. 4C, Delaunay triangulation method is used as an interpolation and extrapolation tool to generate updated residue traveltimes for all acquisition surface locations.

Figure 5A:
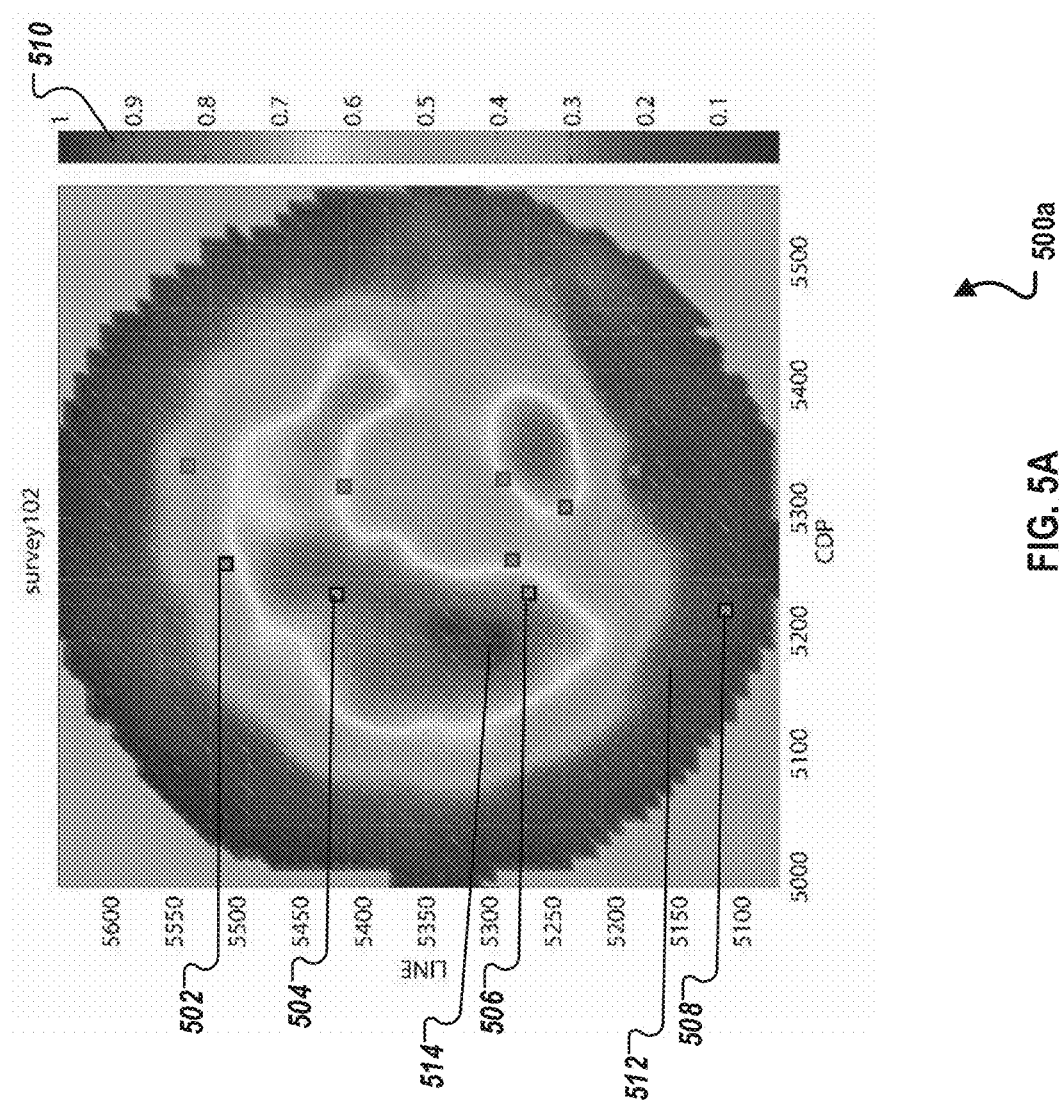
FIG. 5A illustrates Normalized Root Mean Square (NRMS) amplitudes of reflection coefficients at a target horizon, according to some implementations.

FIG. 5A illustrates Normalized Root Mean Square (NRMS) amplitudes 500a of reflection coefficients at a target horizon, according to some implementations. In FIG. 5A, the horizontal and vertical axis represent a grid index in x and y directions of the target horizon, respectively. FIG. 5A shows NRMS amplitudes of reflection coefficients from survey 2 which is acquired in the second month. Black squares 502, 504, 506, and 508 indicate four $CO_2$ injection locations. Color bar 510 depicts a mapping between colors of a color spectrum and a continuous range of a NRMS amplitude value. For example, red areas such as 514 indicate NRMS amplitudes with a value of close to one, while dark blue areas such as 512 indicate NRMS amplitudes with a value of close to zero. Overburden velocities between different surveys are assumed to be the same, and hence, the same focusing operators derived from survey 2 (used as the baseline survey because repeatability was better obtained in survey 2 and subsequent surveys perhaps due to partial consolidation of surface) are applied for different surveys for generating seismic images.

Figure 5B:
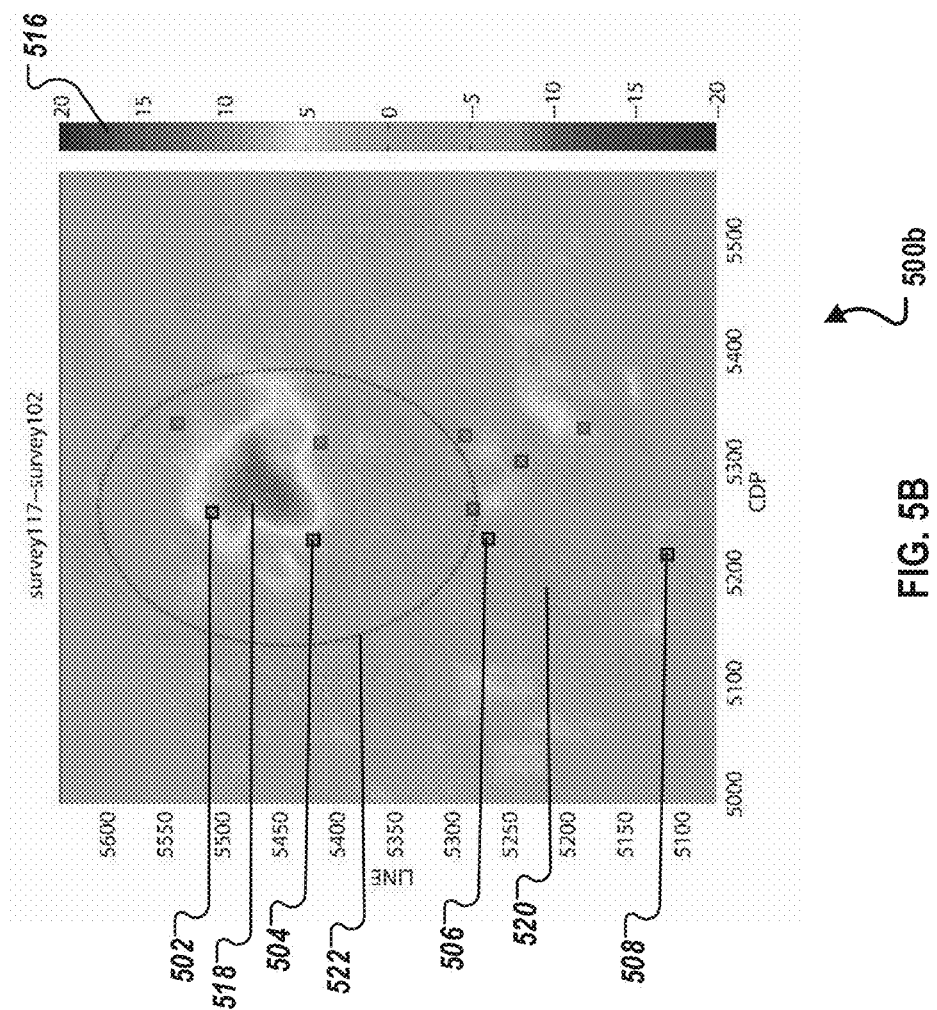
FIG. 5B illustrates NRMS amplitude differences between survey 2 and survey 17, according to some implementations.

FIG. 5B illustrates NRMS amplitude differences 500b between survey 2 and survey 17, according to some implementations. Survey 17 (not shown) occurs 15 months after survey 2. Color bar 516 depicts a mapping between colors of a color spectrum and a continuous range of a NRMS amplitude difference. For example, orange areas such as 518 indicate NRMS amplitude differences with a value of 10, while light blue areas such as 520 indicate NRMS amplitudes with a value of about –7. The anomaly in the red circle 522 is considered to be related to the $CO_2$ injection, which agrees with a prediction generated using a reservoir simulator, but better defines the boundaries of the $CO_2$ plume.

Figure 6:
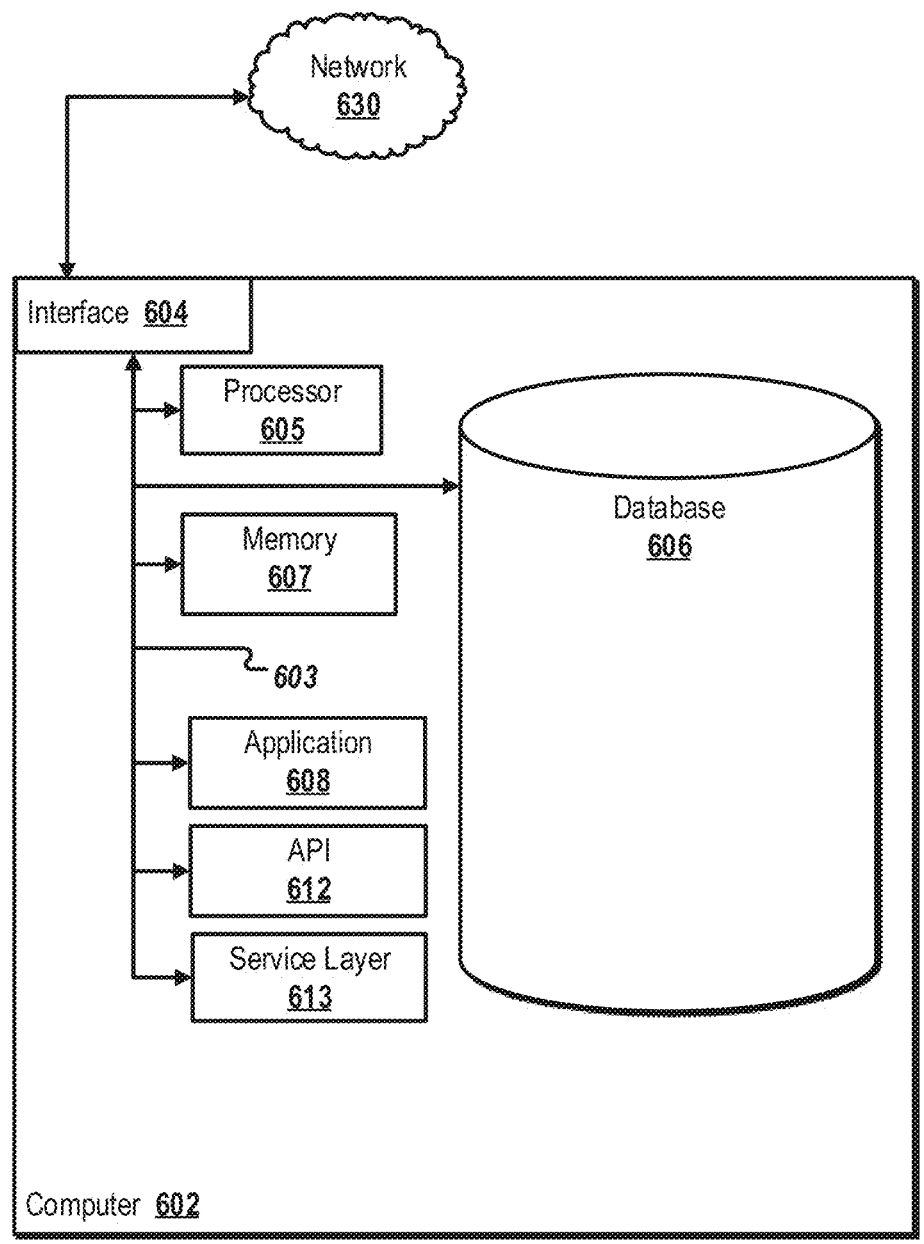
FIG. 6 is a block diagram illustrating an example computer system used to provide computational functionalities associated with described algorithms, methods, functions, processes, flows, and procedures as described in the instant disclosure, according to some implementations.

FIG. 6 is a block diagram of an example computer system 600 used to provide computational functionalities associated with described algorithms, methods, functions, processes, flows, and procedures as described in the instant disclosure, according to some implementations. The illustrated computer 602 is intended to encompass any computing device such as a server, desktop computer, laptop/notebook computer, wireless data port, smart phone, personal data assistant (PDA), tablet computing device, or one or more processors within these devices, including physical or virtual instances (or both) of the computing device. Additionally, the computer 602 may comprise a computer that includes an input device (such as a keypad, keyboard, or touch screen that can accept user information), and an output device that conveys information associated with the operation of the computer 602 (for example, conveying digital data, visual, or audio information (or a combination of information) on a graphical user interface (GUI)).

The computer 602 can serve in a role as a client, network component, a server, a database, or a combination of roles for performing the subject matter described in the instant disclosure. The illustrated computer 602 is communicably coupled with a network 630. In some implementations, one or more components of the computer 602 may be configured to operate within environments, including cloud-computing-based, local, global, or a combination of environments.

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or a combination of servers.

The computer 602 can receive requests over network 630 from a client application (for example, executing on another computer 602) and responding to the received requests by processing the received requests using an appropriate software application(s). In addition, requests may also be sent to the computer 602 from internal users (for example, from a command console), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or a combination of computing languages providing data in extensible markup language (XML) format or a combination of formats. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory or conventional database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. For example, the database 606 can hold seismic data sets for continuous seismic reservoir monitoring.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

There may be any number of computers 602 associated with, or external to, a computer system containing computer 602, each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Described implementations of the subject matter can include one or more features, alone or in combination.

For example, in a first implementation, a method includes receiving a plurality of seismic data sets associated with a reservoir during a period, where the plurality of seismic data sets corresponds to seismic data received at different times during the period. The reservoir includes a plurality of reflectors, where each reflector has a reflection coefficient. For each of the plurality of seismic data sets, reflection coefficients of the plurality of reflectors are determined by iteratively updating CFP operators associated with the plurality of reflectors and a plurality of acquisition surface locations. The reflection coefficients corresponding to different seismic data sets are compared to determine changes of the reflection coefficients during the period. The changes of the reflection coefficients are displayed.

The foregoing and other described implementations can each, optionally, include one or more of the following features:

A first feature, combinable with any of the following features, wherein each CFP operator indicates a propagation time between a particular reflector and a particular acquisition surface location.

A second feature, combinable with any of the previous or following features, wherein iteratively updating CFP operators associated with the plurality of reflectors and the plurality of acquisition surface locations comprises, for a particular reflector $z_m$ and a particular acquisition surface location $z_0$, calculating an updated CFP operator at (i+1)th iteration using $$F^{(i+1)}(z_0, z_m) = F^{(i)}(z_0, z_m)\Delta F^{(i)}(z_0, z_m) \text{ and } \Delta F^{(i)}(z_0, z_m) = e^{i\omega\frac{\Delta T^{(i)}}{2}},$$

where $\Delta T^{(i)}$ is a residue propagation time determined based on differential time shift (DTS) gathers in ith iteration.

A third feature, combinable with any of the previous or following features, the method further comprising for the particular reflector $z_m$ and the particular acquisition surface location $z_0$, determining an initial CFP operator based on an initial estimate of the propagation time between the particular reflector $z_m$ and particular acquisition surface location $z_0$.

A fourth feature, combinable with any of the previous or following features, the method further comprising, for each of the plurality of seismic data sets, generating a three-dimensional seismic image of the reservoir based on the determined reflection coefficients of the plurality of reflectors.

A fifth feature, combinable with any of the previous or following features, wherein the plurality of acquisition surface locations comprises seismic source locations and seismic receiver locations.

A sixth feature, combinable with any of the previous or following features, wherein the reservoir comprises a hydrocarbon liquid.

In a second implementation, a system comprising a computer memory, and one or more hardware processors interoperably coupled with the computer memory. The one or more hardware processors are configured to perform operations including receiving a plurality of seismic data sets associated with a reservoir during a period, where the plurality of seismic data sets corresponds to seismic data received at different times during the period. The reservoir includes a plurality of reflectors, where each reflector has a reflection coefficient. For each of the plurality of seismic data sets, reflection coefficients of the plurality of reflectors are determined by iteratively updating CFP operators associated with the plurality of reflectors and a plurality of acquisition surface locations. The reflection coefficients corresponding to different seismic data sets are compared to determine changes of the reflection coefficients during the period. The changes of the reflection coefficients are displayed.

The foregoing and other described implementations can each, optionally, include one or more of the following features:

A first feature, combinable with any of the following features, wherein each CFP operator indicates a propagation time between a particular reflector and a particular acquisition surface location.

A second feature, combinable with any of the previous or following features, wherein iteratively updating CFP operators associated with the plurality of reflectors and the plurality of acquisition surface locations comprises, for a particular reflector $z_m$ and a particular acquisition surface location $z_0$, calculating an updated CFP operator at (i+1)th iteration using $$F^{(i+1)}(z_0, z_m) = F^{(i)}(z_0, z_m)\Delta F^{(i)}(z_0, z_m) \text{ and } \Delta F^{(i)}(z_0, z_m) = e^{i\omega\frac{\Delta T^{(i)}}{2}},$$

where $\Delta T^{(i)}$ is a residue propagation time determined based on differential time shift (DTS) gathers in ith iteration.

A third feature, combinable with any of the previous or following features, wherein the operations further comprise, for the particular reflector $z_m$ and the particular acquisition surface location $z_0$, determining an initial CFP operator based on an initial estimate of the propagation time between the particular reflector $z_m$ and particular acquisition surface location $z_0$.

A fourth feature, combinable with any of the previous or following features, wherein the operations further comprise, for each of the plurality of seismic data sets, generating a three-dimensional seismic image of the reservoir based on the determined reflection coefficients of the plurality of reflectors.

A fifth feature, combinable with any of the previous or following features, wherein the plurality of acquisition surface locations comprises seismic source locations and seismic receiver locations.

A sixth feature, combinable with any of the previous or following features, wherein the reservoir comprises a hydrocarbon liquid.

In a third implementation, a non-transitory, computer-readable medium storing one or more instructions executable by a computer system to perform operations including receiving a plurality of seismic data sets associated with a reservoir during a period, where the plurality of seismic data sets corresponds to seismic data received at different times during the period. The reservoir includes a plurality of reflectors, where each reflector has a reflection coefficient. For each of the plurality of seismic data sets, reflection coefficients of the plurality of reflectors are determined by iteratively updating CFP operators associated with the plurality of reflectors and a plurality of acquisition surface locations. The reflection coefficients corresponding to different seismic data sets are compared to determine changes of the reflection coefficients during the period. The changes of the reflection coefficients are displayed.

The foregoing and other described implementations can each, optionally, include one or more of the following features:

A first feature, combinable with any of the following features, wherein each CFP operator indicates a propagation time between a particular reflector and a particular acquisition surface location.

A second feature, combinable with any of the previous or following features, wherein iteratively updating CFP operators associated with the plurality of reflectors and the plurality of acquisition surface locations comprises, for a particular reflector $z_m$ and a particular acquisition surface location $z_0$, calculating an updated CFP operator at (i+1)th iteration using $$F^{(i+1)}(z_0, z_m) = F^{(i)}(z_0, z_m)\Delta F^{(i)}(z_0, z_m) \text{ and } \Delta F^{(i)}(z_0, z_m) = e^{j\omega\frac{\Delta T^{(i)}}{2}},$$

where $\Delta T^{(i)}$ is a residue propagation time determined based on differential time shift (DTS) gathers in ith iteration.

A third feature, combinable with any of the previous or following features, wherein the operations further comprise, for the particular reflector $z_m$ and the particular acquisition surface location $z_0$, determining an initial CFP operator based on an initial estimate of the propagation time between the particular reflector $z_m$ and particular acquisition surface location $z_0$.

A fourth feature, combinable with any of the previous or following features, wherein the operations further comprise, for each of the plurality of seismic data sets, generating a three-dimensional seismic image of the reservoir based on the determined reflection coefficients of the plurality of reflectors.

A fifth feature, combinable with any of the previous or following features, wherein the plurality of acquisition surface locations comprises seismic source locations and seismic receiver locations.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or a combination of operating systems.

A computer program, which may also be referred to or described as a program, software, a software application, a module, a software module, a script, or code can be written in any form of programming language, including compiled or interpreted languages, or declarative or procedural languages. The computer program can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices (for example, erasable programmable read-only memory (EPROM), electrically erasable programmable read-only memory (EEPROM), and flash memory devices), magnetic disks (for example, internal hard disks or removable disks), magneto-optical disks, and optical memory devices (for example, CD-ROM, DVD+/-R, DVD-RAM, and DVD-ROM disks). The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component (for example, as a data server), or that includes a middleware component (for example, an application server), or that includes a front-end component (for example, a client computer having a graphical user interface or a Web browser through which a user can interact with an implementation of the subject matter described in this specification), or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or a combination of communication networks. The network may communicate data between network addresses, for example, Internet Protocol (IP) packets, Frame Relay frames, Asynchronous Transfer Mode (ATM) cells, voice, or video.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations of particular concepts. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations. It should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

The invention claimed is:

1. A method for continuous seismic reservoir monitoring of seismic reservoirs, comprising:
receiving a plurality of seismic data sets associated with a reservoir during a period of time, wherein the plurality of seismic data sets corresponds to seismic data received at different times during the period of time, and the reservoir includes a plurality of reflectors, wherein each reflector has a reflection coefficient;
for each of the plurality of seismic data sets, determining reflection coefficients of the plurality of reflectors by iteratively updating common focus point (CFP) operators associated with the plurality of reflectors and a plurality of acquisition surface locations;
comparing the reflection coefficients corresponding to different seismic data sets to determine changes of the reflection coefficients during the period of time; and
displaying, for presentation to a user as part of the continuous seismic reservoir monitoring, the changes of the reflection coefficients, including:
displaying, relative to x and y directions of a target horizon, differences of normalized root mean square (NRMS) amplitudes of the changes of the reflection coefficients; and
representing amplitudes of the differences of the NRMS amplitudes of changes of the reflection coefficients using different colors mapped to a color spectrum of a continuous range of a NRMS amplitudes.

2. The method of claim 1, wherein each CFP operator indicates a propagation time between a particular reflector and a particular acquisition surface location.

3. The method of claim 1, wherein iteratively updating CFP operators associated with the plurality of reflectors and the plurality of acquisition surface locations comprises, for a particular reflector $z_m$ and a particular acquisition surface location $z_0$, calculating an updated CFP operator at (i+1)th iteration using $$F^{(i+1)}(z_0, z_m) = F^{(i)}(z_0, z_m)\Delta F^{(i)}(z_0, z_m) \text{ and } \Delta F^{(i)}(z_0, z_m) = e^{i\omega \frac{\Delta T^{(i)}}{2}},$$

where $\Delta T^{(i)}$ is a residue propagation time determined based on differential time shift (DTS) gathers in ith iteration.

4. The method of claim 3, further comprising for the particular reflector zm and the particular acquisition surface location z0, determining an initial CFP operator based on an initial estimate of a propagation time between the particular reflector zm and particular acquisition surface location z0.

5. The method of claim 1, further comprising, for each of the plurality of seismic data sets, generating a three-dimensional seismic image of the reservoir based on the determined reflection coefficients of the plurality of reflectors.

6. The method of claim 1, wherein the plurality of acquisition surface locations comprises seismic source locations and seismic receiver locations.

7. The method of claim 1, wherein the reservoir comprises a hydrocarbon liquid.

8. A system for continuous seismic reservoir monitoring of seismic reservoirs, comprising:
a computer memory; and
one or more hardware processors interoperably coupled with the computer memory and configured to perform operations comprising:
receiving a plurality of seismic data sets associated with a reservoir during a period of time, wherein the plurality of seismic data sets corresponds to seismic data received at different times during the period of time, and the reservoir includes a plurality of reflectors, wherein each reflector has a reflection coefficient;
for each of the plurality of seismic data sets, determining reflection coefficients of the plurality of reflectors by iteratively updating common focus point (CFP) operators associated with the plurality of reflectors and a plurality of acquisition surface locations;
comparing the reflection coefficients corresponding to different seismic data sets to determine changes of the reflection coefficients during the period of time; and
displaying, for presentation to a user as part of the continuous seismic reservoir monitoring, the changes of the reflection coefficients, including:
displaying, relative to x and y directions of a target horizon, differences of normalized root mean square (NRMS) amplitudes of the changes of the reflection coefficients; and
representing amplitudes of the differences of the NRMS amplitudes of changes of the reflection coefficients using different colors mapped to a color spectrum of a continuous range of a NRMS amplitudes.

9. The system of claim 8, wherein each CFP operator indicates a propagation time between a particular reflector and a particular acquisition surface location.

10. The system of claim 8, wherein iteratively updating CFP operators associated with the plurality of reflectors and the plurality of acquisition surface locations comprises, for a particular reflector $z_m$ and a particular acquisition surface location $z_0$, calculating an updated CFP operator at (i+1)th iteration using $$F^{(i+1)}(z_0, z_m) = F^{(i)}(z_0, z_m)\Delta F^{(i)}(z_0, z_m)$$

$$\Delta F^{(i)}(z_0, z_m) = e^{i\omega \frac{\Delta T^{(i)}}{2}}$$

where $\Delta T^{(i)}$ is a residue propagation time determined based on differential time shift (DTS) gathers in ith iteration.

11. The system of claim 10, wherein the operations further comprise, for the particular reflector zm and the particular acquisition surface location z0, determining an initial CFP operator based on an initial estimate of a propagation time between the particular reflector zm and particular acquisition surface location z0.

12. The system of claim 8, wherein the operations further comprise, for each of the plurality of seismic data sets, generating a three-dimensional seismic image of the reservoir based on the determined reflection coefficients of the plurality of reflectors.

13. The system of claim 8, wherein the plurality of acquisition surface locations comprises seismic source locations and seismic receiver locations.

14. The system of claim 8, wherein the reservoir comprises a hydrocarbon liquid.

15. A non-transitory, computer-readable medium storing one or more instructions executable by a computer system to perform operations for continuous seismic reservoir monitoring of seismic reservoirs comprising:
receiving a plurality of seismic data sets associated with a reservoir during a period of time, wherein the plurality of seismic data sets corresponds to seismic data received at different times during the period of time, and the reservoir includes a plurality of reflectors, wherein each reflector has a reflection coefficient;
for each of the plurality of seismic data sets, determining reflection coefficients of the plurality of reflectors by iteratively updating common focus point (CFP) operators associated with the plurality of reflectors and a plurality of acquisition surface locations;
comparing the reflection coefficients corresponding to different seismic data sets to determine changes of the reflection coefficients during the period of time; and
displaying, for presentation to a user as part of the continuous seismic reservoir monitoring, the changes of the reflection coefficients, including:
displaying, relative to x and y directions of a target horizon, differences of normalized root mean square (NRMS) amplitudes of the changes of the reflection coefficients; and
representing amplitudes of the differences of the NRMS amplitudes of changes of the reflection coefficients using different colors mapped to a color spectrum of a continuous range of a NRMS amplitudes.

16. The non-transitory, computer-readable medium of claim 15, wherein each CFP operator indicates a propagation time between a particular reflector and a particular acquisition surface location.

17. The non-transitory, computer-readable medium of claim 15, wherein iteratively updating CFP operators associated with the plurality of reflectors and the plurality of acquisition surface locations comprises, for a particular reflector $z_m$ and a particular acquisition surface location $z_0$, calculating an updated CFP operator at (i+1)th iteration using $$F^{(i+1)}(z_0, z_m) = F^{(i)}(z_0, z_m) \Delta F^{(i)}(z_0, z_m)$$

$$\Delta F^{(i)}(z_0, z_m) = e^{i\omega \frac{\Delta T^{(i)}}{2}}$$

where $\Delta T^{(i)}$ is a residue propagation time determined based on differential time shift (DTS) gathers in ith iteration.

18. The non-transitory, computer-readable medium of claim 17, wherein the operations further comprise, for the particular reflector zm and the particular acquisition surface location z0, determining an initial CFP operator based on an initial estimate of a propagation time between the particular reflector zm and particular acquisition surface location z0.

19. The non-transitory, computer-readable medium of claim 15, wherein the operations further comprise, for each of the plurality of seismic data sets, generating a three-dimensional seismic image of the reservoir based on the determined reflection coefficients of the plurality of reflectors.

20. The non-transitory, computer-readable medium of claim 15, wherein the plurality of acquisition surface locations comprises seismic source locations and seismic receiver locations.

* * * * *

UNITED STATES PATENT AND TRADEMARK OFFICE
CERTIFICATE OF CORRECTION

PATENT NO. : 10,914,853 B2
APPLICATION NO. : 15/918611
DATED : February 9, 2021
INVENTOR(S) : Mustafa Naser Al-Ali, Hongwei Liu and Philippe Nivlet It is certified that error appears in the above-identified patent and that said Letters Patent is hereby corrected as shown below:

In the Claims

In Column 18, Line 4, Claim 4, please replace "zm" with -- $z_m$ --

In Column 18, Line 5, Claim 4, please replace "z0" with -- $z_0$ --

In Column 18, Line 7, Claim 4, please replace "zm" with -- $z_m$ --

In Column 18, Line 7, Claim 4, please replace "z0" with -- $z_0$ --

In Column 19, Line 4, Claim 11, please replace "zm" with -- $z_m$ --

In Column 19, Line 5, Claim 11, please replace "z0" with -- $z_0$ --

In Column 19, Line 7, Claim 11, please replace "zm" with -- $z_m$ --

In Column 19, Line 8, Claim 11, please replace "z0" with -- $z_0$ --

In Column 20, Line 28, Claim 18, please replace "zm" with -- $z_m$ --

In Column 20, Line 29, Claim 18, please replace "z0" with -- $z_0$ --

In Column 20, Line 31, Claim 18, please replace "zm" with -- $z_m$ --

In Column 20, Line 31, Claim 18, please replace "z0" with -- $z_0$ --

Signed and Sealed this
First Day of June, 2021

Drew Hirshfeld
*Performing the Functions and Duties of the
Under Secretary of Commerce for Intellectual Property and
Director of the United States Patent and Trademark Office*